Feb. 21, 1928.
E. J. MOHR
1,659,781
COMPOSITE CAST TOOL AND PROCESS OF PRODUCTION THEREOF
Filed Sept. 17, 1923
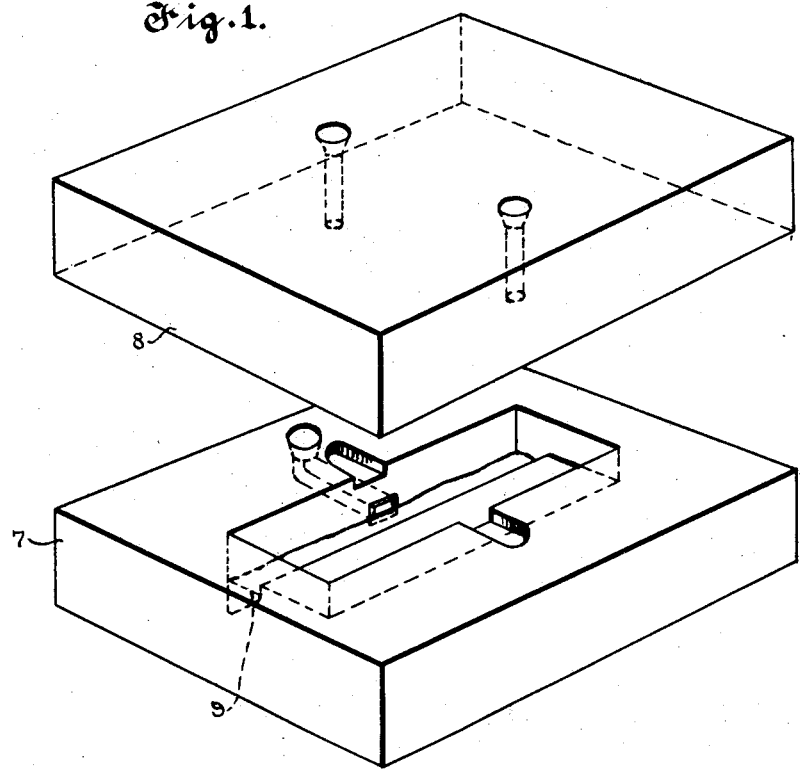
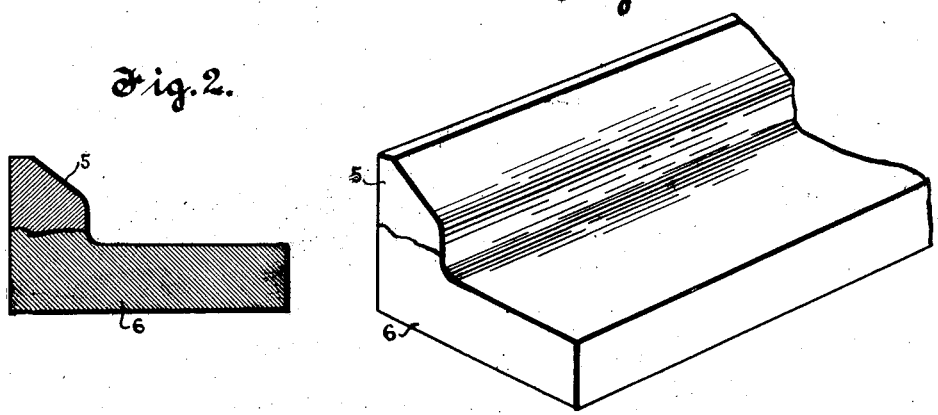
INVENTOR
Erwin J. Mohr
BY
ATTORNEY Patented Feb. 21, 1928.

1,659,781

UNITED STATES PATENT OFFICE.

ERWIN J. MOHR, OF MILWAUKEE, WISCONSIN, ASSIGNOR TO THE KINITE COMPANY, OF MILWAUKEE, WISCONSIN, A CORPORATION OF WISCONSIN.

COMPOSITE CAST TOOL AND PROCESS OF PRODUCTION THEREOF.

Application filed September 17, 1923. Serial No. 663,114.

This invention relates to composite cast tools and process of production thereof.

In the operation of dies and analogous tools ordinarily only a reduced portion of the total area of the tool is brought into directly active relation to the work, whereas the major portion of the bulk of the tool is provided merely or chiefly for lending strength, rigidity, weight or analogous properties.

Hence it has heretofore been proposed to construct the major portion of the toll of some suitable but relatively inexpensive and common material, such, for example, as ordinary steel and to construct the active portion of a special material such as high speed steel or other alloy adapted to the intended use, the two portions being united by welding, forging or an analogous operation.

Such methods of production of composite tools are of course objectionable since the same involve the added operations incident to so uniting the component parts thereof, whereas in numerous instances the distinct constituent materials are not capable of uniting permanently with one another by such treatment. Moreover, in the case of other metals which it is desirable to unite, the same may unite readily but only when subjected to such temperature or other conditions as to destroy or seriously impair the properties of one or both metals or otherwise to impart some feature or quality tending to reduce the utility or availability of the product.

Again it has been proposed to cast composite bodies for certain purposes approximately to the desired shape, that is to say, capable of finishing to shape without forging or hammering, and finishing being understood as not to exclude the limited amount of machining which is ordinarily necessary in order to remove the superficial layer of deteriorated metal which is ordinarily present.

Here again, however, great difficulty has been encountered as a result of the fact that ordinarily one or more of the component portions of the composite body, particularly where the same comprises a tool or the like, is practically unmachinable as cast, whereas the treatment required to render such component portion machinable is ordinarily such as to destroy or seriously impair machinability of another component portion.

The present invention has among its objects that of obviating or minimizing the aforementioned difficulties and disadvantages heretofore incident to the production of composite cast tools and the like.

Another object is that of producing and providing a composite tool or the like, cast to shape, and having each of its component or constituent portions either machinable as cast or capable of being rendered machinable without impairment of machinability of any other component portion thereof.

Another and more specific object is that of providing a composite cast tool having its back portion composed of a material which is maintained machinable at the end of each stage of the treatment imposed and having its face portion either machinable as cast or capable of being rendered machinable without impairment of the machinability of the back portion thereof.

Another object of the present invention is to provide a composite metal casting having two portions, one of which is capable of receiving substantially its maximum hardness by an air-hardening process, and the other portion of which is not capable of being so hardened. Also, the latter portion is one which is machinable as cast, whereas the other portion requires annealing before it can be machined, or it may be machinable as cast, but in either case, after machining, it may be hardened by an air-hardening process, which process does not affect the machinability of the first-named portion.

Another object is that of providing a composite tool which is cast to shape and possesses the characteristics set forth in the last preceding object.

Another object is that of providing advantageous methods of producing such products.

Other objects and advantages will hereinafter appear.

In the accompanying drawing, wherein are illustrated certain of the physical and mechanical features or aspects of the invention;

Figure 1 is a perspective view illustrating a molding flask comprising a drag together with a cope therefor adapted to the purposes of the present invention; while, Figures 2 and 3 are, respectively, vertical sectional and perspective views illustrative of a tool to be cast therein.

Referring first to Figs. 2 and 3 of the drawing, the same illustrate by way of example a forming die constructed as herein contemplated, that is to say, having its upper working portion 5 composed of a particular metal, usually an allow, having the characteristics required in the service contemplated and its lower portion or back 6 composed of a different and in general an inferior metal or alloy.

Assuming the working portion 5 to comprise an alloy tool steel melting at about 2400° F. and the back portion 6 to comprise ordinary steel melting at about 2800° F. a typical process of producing such tool or the like may be described as follows: Drag 7 and cope 8 being prepared and cored to the desired shape of the finished tool and preferably slightly oversize in certain dimensions, metal of the working portion 5 is poured within the drag 7, cope 8 being removed, up to approximately the level of the line 9. A suitable cleansing agent or flux is thereafter spread upon the exposed surface of the cast metal which latter is permitted to cool considerably for setting thereof.

In practicing this invention the tool steel above referred to is one which is capable of being hardened by an air-hardening process or, in other words, a process which will not affect the machinability of the backing portion which may be of any suitable metal, which will not be hardened by an air-hardening process, and which is preferably an ordinary high carbon steel. When metals of this type are employed and are formed into an integral article by casting, the backing portion is machinable as cast and the cutting portion may be machinable or not as cast, but in either case is capable of being machined and subsequently hardened to form a hardened edge by an air-hardening process, which process does not disturb the machinability of the backing portion.

During such cooling period and after addition of the aforementioned fluxing agent the cope 8 is applied to the mould and clamped in place. Thereafter, sufficient back metal is poured into the cope to complete the casting, the temperatures of the earlier and later cast metals being so regulated as in conjunction with the action of the fluxing agent to effect an intimate and homogeneous weld between such working and back metals.

Moreover, the temperature and other conditions, including constitution of the individual metals or alloys are maintained such as to provide machinability of the region of union of such metals, either as cast or upon subjection to suitable annealing or other treatment, also to provide for minimizing the thickness of such region wherein the united metals are mixed or alloyed and to minimize or prevent washing or penetration of one metal within the body of the other.

Thus if the temperature of either or both metals be too high at the instant of contact there exists a strong tendency for the back or base metal to penetrate more or less within the body of the face or working metal even to such an extent as to occupy a part of the surface or bulk of the working portion of the tool, thereby destroying or impairing the value or utility of the tool for its intended purpose.

Again should the temperature of either or both metals be too low at the time of addition of the back metal an imperfect weld is likely to result.

Further, unless the individual uniting metals be suitably related to one another as regards composition and other characteristics and unless the casting and other imposed treatments be suitable and adequately controlled the region of union or mutual alloying of such metals is rendered unmachinable and is moreover unduly thick.

In practice, assuming employment of metals having approximately the respective melting points and other characteristics aforementioned, the face metal should be permitted to cool, for setting, to a temperature of approximately 2000° F. prior to addition of the back metal, the latter being at a temperature not greatly exceeding the minimum temperature which is consistent with adequate flow. Also it is desirable that certain known expedients be employed for chilling the back metal after pouring but prior to contacting with the face metal.

The flux employed may comprise dehydrated borax or an equivalent substance adapted to promote adequate cleansing and ultimate homogeneity of the weld.

As cast the composite tool or body may comprise a back of machinable ordinary steel and an alloy tool steel face which may be practically unmachinable, and although the aforedescribed process is capable of or adapted to casting accurately to size as well as to shape, nevertheless it is in many cases desirable to cast somewhat oversize and to remove a superficial portion of the face material, which surface portion as a result of oxidation and other action incident to casting may be of inferior quality.

Machinability of the back material is also essential, since ordinarily allowance must be made for positive or negative shrinkage, warpage, and other effects which are characteristic of or incident to the treatments to which the material is subjected at different stages in production of the finished tool.

In cases wherein the face material is unmachinable as cast the same may ordinarily be rendered machinable by annealing, suitable precautions being observed in order that machinability of the back be not seriously impaired by such treatment.

However, following annealing and machining of the alloy tool steel face, the same, in general, requires rehardening and this operation unless suitable precautions be taken is likely to impair very seriously machinability of the back metal, assuming the latter to comprise a fairly high carbon steel.

However, it has been found that treatment by heating the composite casting to given temperatures and thereafter permitting the same to cool in air, is adapted to effect adequate hardening of certain of the alloy tool steels which are available for present purposes, without impairing machinability of the high carbon steel comprising the back. Again in cases wherein it is desirable to employ as face metal an alloy tool steel which is not readily hardened in air it is nevertheless possible to so modify the properties of the back metal as to adapt the same to retain machinability under more drastic methods of hardening of the face metal.

While the process aforedescribed is applicable to numerous alloys, the same may with peculiar advantage be applied to materials comprising back metal of ordinary high carbon steel and face metal comprising an alloy including the following ingredients, viz, carbon, chromium, or another element of the chromium group, cobalt, silicon, manganese, iron, preferably in substantially the proportions stated in Patent No. 1,277,431 of September 3, 1918 to Kuehnrich.

The characteristic of the above-mentioned alloy employed for the face metal, among others, is that it is capable of being air-hardened.

Moreover, such an alloy steel has been found capable of being rendered machinable by annealing and is also capable of subsequent hardening in air without impairment of machinability of a back portion comprising ordinary high carbon steel, such alloy and steel, moreover, being adapted under the treatments aforedescribed to unite in a permanent and adequate weld, the region of mutual alloying of such metals being of reduced thickness in a direction transverse to their plane of union. The alloyed metal comprehended in such region is moreover capable of being rendered machinable by annealing under the conditions imposed to impart machinability to the alloy steel face portion of the tool or the like.

What I claim as new and desire to secure by Letters Patent is:

1. A composite cast article having two integrally united portions, one of said portions being ordinary high carbon steel and the other of said portions being a high speed steel which is capable of receiving substantially its maximum hardness by an air hardening process.

2. A composite article having two integrally united portions, one of said portions being ordinary high carbon steel and the other of said portions being an air hardening high speed steel in its hardened condition.

3. A composite cast article having two integrally united portions, one of said portions being machinable steel, not subject to being hardened by an air hardening process, and the other of said portions being a high speed steel which is capable of receiving substantially its maximum hardness by an air hardening process.

4. A composite cutting tool comprising a cutting portion of steel containing approximately the following; substantially 1.2% to 3.5% of carbon, 8% to 20% of chromium, 1% to 6% of cobalt, and a backing portion of ordinary high carbon steel, said two portions being integrally united.

5. The process of producing a composite article which consists in casting a part of ordinary high carbon steel upon a previously cast portion of high speed steel capable of receiving substantially its maximum hardness by an air hardening process, when said high speed steel portion has cooled sufficiently to prevent excessive diffusion of the two metals, and when said composite article has solidified annealing said article, then machining said article and subsequently air hardening said high speed steel portion.

6. The process of treating composite articles having two integrally united portions, one of which is capable of receiving substantially its maximum hardness by an air hardening process and the other of which is not capable of being so hardened, which consists in annealing said article, then machining said article, and subsequently hardening said first portion by an air hardening process.

In witness whereof, I have hereunto subscribed my name.

ERWIN J. MOHR.